Oct. 28, 1969   D. D. LIEDEL   3,474,686
REMOTE CONTROL DEVICE UTILIZING MOTION AMPLIFICATION
Filed April 7, 1967   2 Sheets-Sheet 2
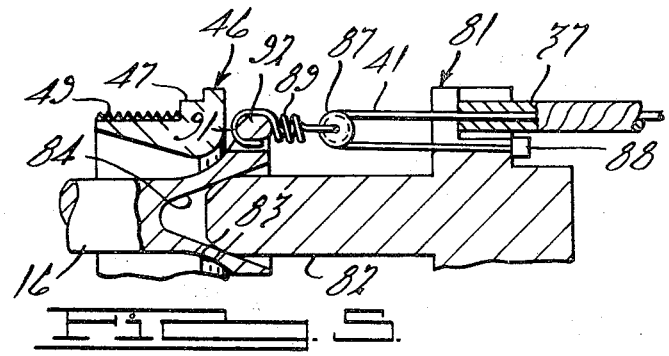
FIG. 5.
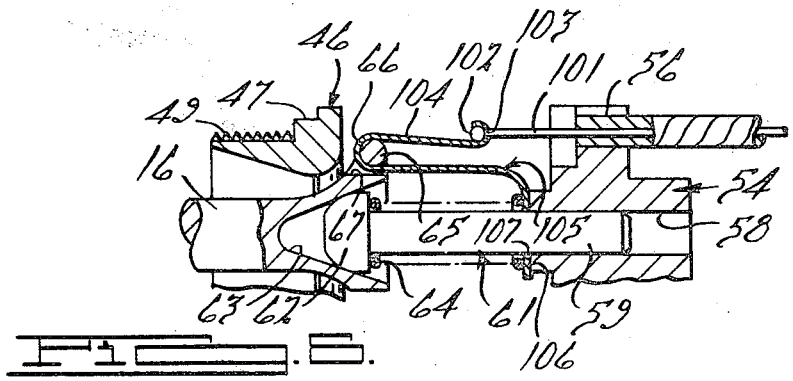
FIG. 6.
FIG. 7.
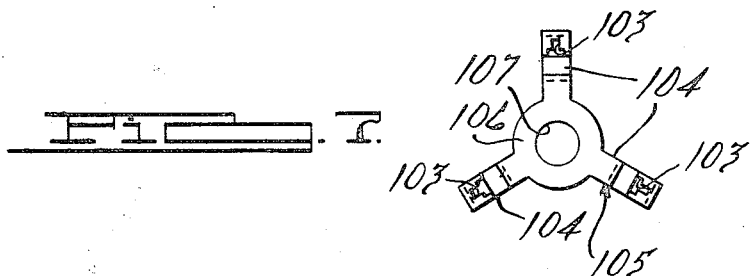
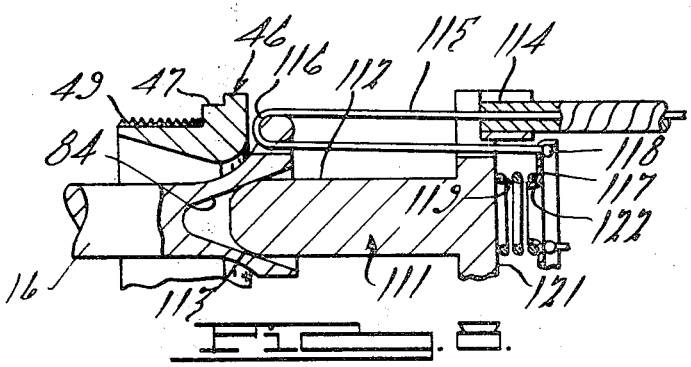
FIG. 8.
INVENTOR.
Douglas D. Liedel
BY
Harness, Dickey & Pierce
ATTORNEYS

# United States Patent Office 3,474,686
Patented Oct. 28, 1969

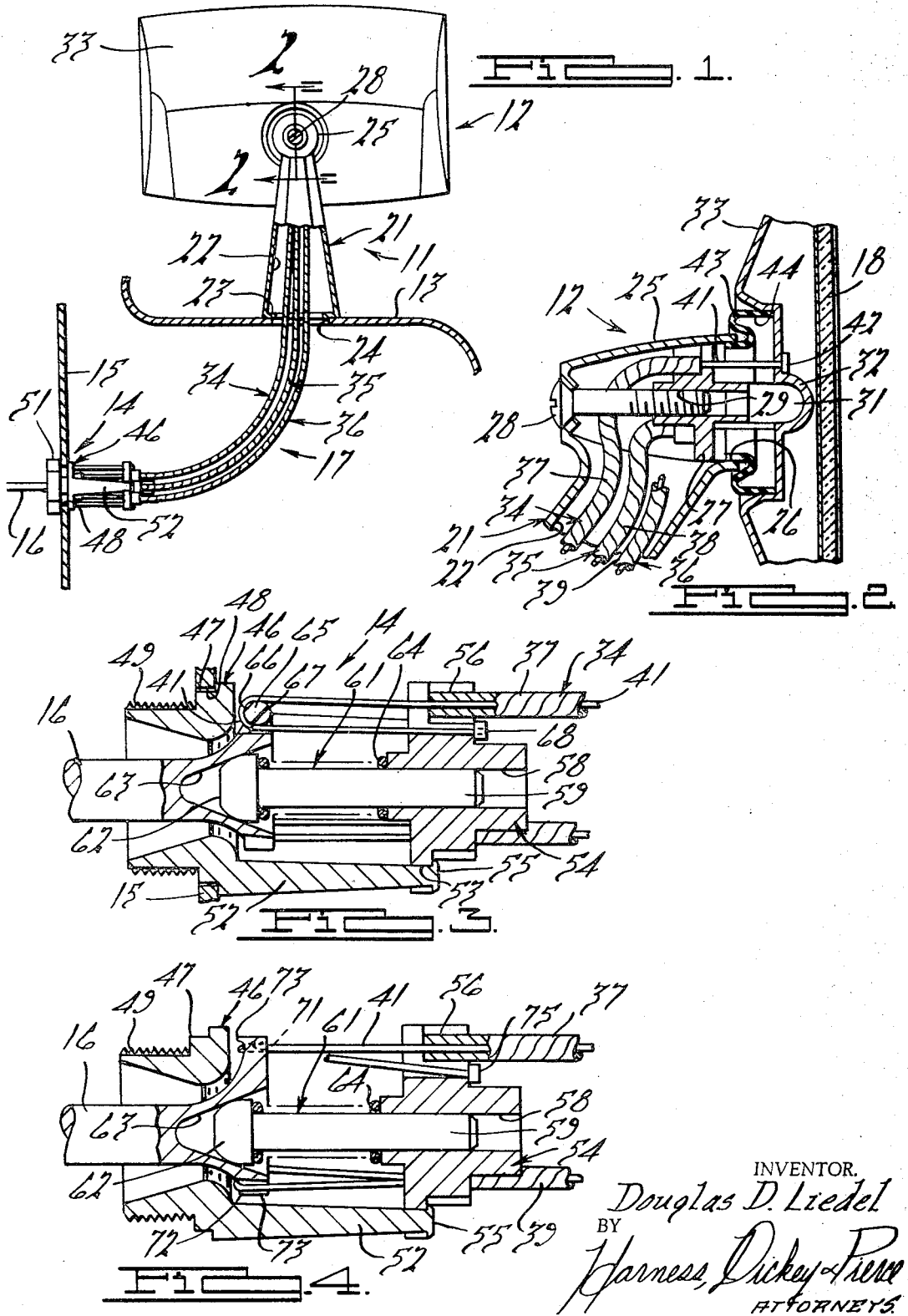

3,474,686
REMOTE CONTROL DEVICE UTILIZING
MOTION AMPLIFICATION
Douglas D. Liedel, Belleville, Mich., assignor to C. M.
Hall Lamp Company, a corporation of Michigan
Filed Apr. 7, 1967, Ser. No. 629,148
Int. Cl. F16c 1/12; G05g 1/04
U.S. Cl. 74—501
18 Claims

ABSTRACT OF THE DISCLOSURE

A mirror is positioned by means of a plurality of flexible transmitters that are connected at one end to a control member positioned within the vehicle and at their other end to a mirror that is supported for pivotal movement on the exterior sheet metal of the vehicle. The operative connection between the one end of each of the flexible transmitters and the control member provides for an amplification of the movement of the transmitters with respect to the control signal or movement of the control member. This amplification is achieved by passing the respective end of the flexible member over a smooth portion of the control member and anchoring it to a member fixed relative to the point of pivotal support of the control member. This relationship gives approximately a two-to-one amplification and results in substantially greater pivotal movement of the controlled mirror than the angular movement of the control member.

BACKGROUND OF THE INVENTION

This invention relates to a remote control device for transmitting an amplified controlled signal from a control member to a controlled member.

One common form of remote control device is the remote control rear view mirror found on many passenger cars. In such control devices, a mirror is mounted for pivotal movement on the exterior sheet metal of the vehicle, most commonly the driver's door, and its angular position may be adjusted by a control member that is supported for pivotal movement inside of the passenger compartment. The control signal is transmitted by a plurality of flexible transmitters that interconnect the control member with the mirror. For many reasons it is most desirable to keep the control member as small as practical. In addition to aesthetic and safety considerations, compact control members facilitate installation. These devices are conventionally mounted on the vehicle by passing the control member and the associated flexible cables through openings formed in the body sheet metal and in the door panel. By maintaining a small size control member this threading operation is facilitated. A relatively wide range of adjustment is required for these devices, however, to suit drivers of various stature. It is frequently difficult, if not impossible, to achieve the necessary pivotal movement of the controlled mirror with a relatively small control member.

It is, therefore, the principal object of this invention to provide a remote control device that gives a signal amplification from the control member to the controlled member.

It is another object of this invention to provide a remote control rear view mirror having an amplified degree of movement of the mirror in response to a given signal from the control member.

It is another object of this invention to provide a remote controlled device of a flexible transmitter type having a signal amplification.

SUMMARY OF THE INVENTION

A remote control device embodying this invention is particularly adapted to transmit a control signal from a control member to a controlled member. The control member is supported for universal pivotal movement as is the controlled member. At least one flexible transmitter is operatively connected to the controlled member and to the control member. The flexible transmitter transmits pivotal movement of the control member into pivotal movement of the controlled member. The operative connection between the flexible transmitter and one of the members includes amplifying means for magnifying the degree of movement of the controlled member in response to a given pivotal movement of the control member.

BRIEF DESCRIPTION OF THE DRAWINGS

FIGURE 1 is a side elevational view, with portions broken away, of a remote controlled automotive rear view mirror showing a first embodiment of this invention.

FIGURE 2 is an enlarged cross sectional view taken along the line 2—2 of FIGURE 1 and showing the construction at the mirror.

FIGURE 3 is an enlarged cross cectional view of the control member shown in FIGURE 1.

FIGURE 4 is a cross sectional view, in part similar to FIGURE 3, and showing another embodiment of the invention.

FIGURE 5 is a cross sectional view, in part similar to FIGURES 3 and 4, showing still another embodiment of the invention.

FIGURE 6 is a cross sectional view, in part similar to FIGURES 3, 4 and 5, showing a further embodiment of the invention.

FIGURE 7 is an elevational view of the tie down spring employed in the embodiment of FIGURE 6.

FIGURE 8 is a cross sectional view, in part similar to FIGURES 3, 4, 5 and 6, showing a still further embodiment of the invention.

DETAILED DESCRIPTION OF THE PREFERRED EMBODIMENTS

In FIGURES 1 through 3 a remote control rear view mirror assembly embodying this invention is identified generally by the reference numeral 11. It is to be understood that, although the invention is described in connection with a remote control rear view mirror for a motor vehicle, the invention is susceptible of use in other combinations and environments. The remote control mirror assembly 11 is comprised of a mirror unit 12 that is adapted to be supported upon the driver's door or other exterior sheet metal 13 of a motor vehicle. A control member assembly, indicated generally by the reference numeral 14, is supported within the passenger compartment upon a door panel 15 or other interior component thereof. The control member assembly 14 includes a control lever 16 that may be manipulated for adjustment by the vehicle operator. A flexible transmitter assembly indicated by the reference numeral 17 interconnects the control member assembly 14 with a mirror glass 18 of the mirror unit 12 for adjusting its position.

Referring now in detail to FIGURE 2, the mirror unit 12 is comprised of a mounting bracket 21 having an upstanding post that defines an internal cavity 22 and terminates at its lower end in a flange 23 that is affixed to the body sheet metal 13 in overlying relationship with a circular aperture 24 formed therein. The upper end of the mounting bracket 21 defines a generally cylindrical shaped section 25 terminating in a rearwardly extending opening 26. A supporting member 27 is affixed within the bracket portion 25 by means of an elongated bolt 28 that is threaded into a female threaded opening 29 in the supporting member 27. The supporting member 27 supports a rearwardly extending spherical journal member 31 that receives and pivotally supports a complementary socket portion 32 of a mirror frame 33. The mirror frame 33 is flared outwardly and is affixed to the mirror glass 18 in any known manner.

The flexible transmitter assembly 17 is comprised of a plurality of flexible transmitters, three such transmitters 34, 35 and 36 being illustrated in the depicted embodiment. Each of the flexible transmitters 34, 35 and 36 has a respective outer protective sheath 37, 38 and 39. One end of each of the sheaths 37, 38 and 39 is fixed within spaced apertures formed in the supporting member 27 at locations radially outwardly of the center of the spherical portion 31 and around the axis about which the mirror glass 18 and its frame 33 pivots. Each of the flexible transmitters 34, 35, 36 includes a substantially incompressible flexible wire actuator 41. Each of these flexible actuators 41 is affixed relative to the mirror frame 33, as indicated generally by the reference numeral 42. The point at which the flexible actuators 41 are secured to the mirror frame 33 is spaced outwardly from the socket portion 32 so that a tensioning force exerted upon the actuators 41 will cause the mirror glass 18 to pivot with respect to the mirror supporting bracket 21. A flexible boot 43 encircles the mounting portion opening 26 and is affixed within a depressed cavity 44 formed in the rear face of the mirror frame 33 to preclude moisture and foreign matter from entering into the interior of the mirror assembly. The construction thus far described in detail is fully disclosed in my copending application entitled "Remote Controlled Mirror," Ser. No. 629,177, filed Apr. 7, 1969, and assigned to the assignee of this invention.

Referring now in detail to FIGURE 3, the control member assembly 14 is comprised of a retainer member, indicated generally by the reference numeral 46, which encircles the control lever 16 and has a section 47 that is adapted to extend through an opening 48 in the door panel 15, which opening is preferably somewhat smaller in area than the opening 24 in the sheet metal 13. A shoulder is formed at one end of the section 47 that faces and abuttingly engages the inner surface of the panel 15. Adjacent the section 47, an integral, smaller male threaded portion 49 is provided that extends through the panel 15 and that is adapted to receive a nut 51 for affixing the control member 14 relative to the panel 15.

The retainer member 46 has a plurality of inwardly extending projections or fingers 52 that extend through complementary openings 53 formed in a base member 54 having a geenrally cylindrical shape. Headed end portions 55 of the retainer fingers 52 fix the base member 54 with respect to the retainer member 46. The ends of the sheaths 37, 38 and 39 opposite to those fixed relative to the mirror head assembly 12 are received in and fixed to complementary openings in the base member 54 as indicated by the reference numeral 56.

A cylindrical bore 58 is formed concentrically in the base member 54 and slidably receives a cylindrical portion 59 of a plunger 61. The plunger 61 is formed with an enlarged headed portion 62 having a surface that is generally a segment of a sphere. The plunger headed portion 62 is received in a generally conical recess 63 formed in the inner face of the actuator lever 16 so that the actuator lever 16 is supported for universal pivotal movement upon the plunger 61. A coil spring 64 encircles the plunger portion 59 and engages the plunger headed portion 62 at one end and a shoulder formed on the base 54 at its other end to urge the plunger 61 to the left relative to the base.

The inner end of the actuator lever 16 is formed with three integral, outwardly extending arms 65 (only one of which appears in FIGURE 3). Each of the arms 65 defines a generally cylindrical surface 66 that is normal to the axis of the plunger 61 and which terminates adjacent a respective cylindrical opening 67. Each of the openings 67 extends generally parallel to the axis of the plunger 61. The surfaces 66 define a smooth guide portion across which a portion of the respective wire actuator 41 extends. Each wire actuator 41 extends through an opening in the base 54 from the respective end of the sheath 37, across the surface 66 and back toward the base 54. The end of each wire actuator 41 is staked, as at 68, on the far side of the base 54. The force of the spring 64 on the plunger 61 and actuator lever 16 tensions the wire actuators 41 and holds the mirror socket portion 32 in engagement with the supporting portion 31 (FIGURE 2).

It should be readily apparent to those skilled in the art that pivotal movement of the actuator lever 16 will result in a control signal that is transmitted through the flexible ransmitter assembly 17 to the mirror 18 so that its position may be adjusted from within the vehicle. In previous commercial devices of this type, it has been the practice to directly attach the wire actuators 41 relative to the control lever. In such a construction, the angular movement of the mirror will be approximately equal to the angular movement of the control lever. In many instances it is difficult to obtain the desired overall range of adjustment of the mirror in such a construction.

In the described embodiment, the unique manner in which the wire actuators 41 are associated with the control lever 16 and the base 54 provides an amplification in the signal transmitted from the control lever 16 to the mirror 18. The described construction may be likened to a block and tackle in that with this construction a given angular movement of the control lever 16 causes the wire actuators 41 to move a distance with respect to the associated end of the protective sheath 37 twice the distance that they would move if the wire actuators 41 were directly connected to the lever 16. Therefore, the angular movement of the mirror 18 will be approximately twice the angular movement of the control lever 16.

The remaining embodiments described below also accomplish a like amplification in the control signal. Certain of these embodiments employ elements which are the same as or similar to elements of the previously described embodiment. In such cases, the same reference numeral has been used to denote an element which is the same as or similar to one which has been pivously described and a detailed description of such elements is not repeated. In addition, the connection between the control member in each of the subsequently described embodiments to its associated mirror unit may be considered to be the same as in the embodiment of FIGURES 1 through 3 and for this reason has not been illustrated.

Another construction for accomplishing the force amplification at the control member is shown in FIGURE 4. This embodiment is similar in most respects to that of FIGURE 3. In this embodiment the inner end of the control lever 16 differs from the previously described embodiment as does the relation of the wire actuators 41 to this part of the control lever 16. Each actuator 41 extends through displaced bores 71 and 72 formed in a respective, outstanding flange portion 73 of the actuator 16. The actuator 41 is wrapped around a smooth surface of the flange portion 73 between the bores 71 and 72 and is staked at one end, as at 75, relative to the base portion 54. This embodiment will also provide approximately a two-times signal amplification between the control lever 16 and the mirror 18.

Another embodiment of the invention is shown in FIGURE 5, which embodiment also provides approximately a two-times signal amplification. In this embodiment the retainer member 46 and its connection to the base assembly, indicated by the reference numeral 81 in this embodiment, are substantially the same as in the embodiments previously described. In this embodiment, however, the base assembly 81 is provided with a forwardly extending cylindrical portion 82 that defines a surface 83 that is a segment of a sphere. The segment 83 is received in a generally conical recess 84 formed in the actuator lever 16 for pivotally supporting the actuator lever 16 upon the base assembly surface 83 for universal pivotal movement. The respective end of the sheath 37 of each flexible transmitter is affixed to the base assembly 81 in any known manner.

Each wire actuator 41 is wrapped around a respective pulley 87 and fixed to the base 81 at one end, as shown at 88. Each pulley 87 is journaled upon an offset arm of a tension spring 89, the other end of which is fixed, as at 91, to an outwardly extending arm 92 of the actuator lever 16. The springs 89 maintain the desired force upon the actuator lever bringing it into engagement with the base surface 83 and hold the ball and socket connection of the mirror assembly (FIGURE 2) in engagement. The individual springs 89 also maintain the desired tension on the respective actuator wires 41.

A still further embodiment of the invention is shown in FIGURES 6 and 7. This embodiment is substantially the same as in the embodiment shown in FIGURE 3 with only the manner in which the ends of the wire actuators are fixed to the base 54 being different. In this embodiment each wire actuator 101 associated with the respective transmitter assemblies is formed with an enlarged headed portion 102 at the end adjacent the actuator lever 16. This headed portion 102 extends through a T-shaped opening 103 (FIGURE 7) formed in a respective arm 104 of a generally spoke-shaped tie off spring member, indicated generally by the reference numeral 105. Each arm 104 of the tie off spring assembly 105 extends across the smooth portion 66 of the actuator lever flange. The arms 104 of the tie off spring assembly merge in a hub portion 106 formed with a central opening 107 that is received around the plunger portion 59. The spring 64 maintains the hub portion 106 in engagement with the base 54. Pivotal movement of the actuator lever 16 will cause the tie off spring arms 104 to slide across the respective actuator lever surface 66 and results in a signal amplification as in the previously described embodiments.

FIGURE 8 shows a still further embodiment of the invention which also achieves a signal amplification but employs a different location for the tensioning spring. This embodiment is similar to the embodiment shown in FIGURE 5 in that its base 111 is fixed to the retainer portion 46 as in the previously described embodiment and includes a forwardly extending cylindrical portion 112 that terminates in a surface 113 which is a segment of a sphere and is received in the actuator lever recess 84. The actuator lever 16 is thus mounted for universal pivotal movement upon the base surface 113.

The flexible transmitters in this embodiment have protective sheaths 114 affixed to the base 111 as in the previously described embodiments. Each wire actuator 115 extends across a respective smooth surface 116 on the actuator lever flange and back toward the base flange. The ends of the transmitters 115 pass through respective openings in the base and are engaged with the underside of a cup-shaped sheet metal member 117. These ends are fixed in place with respect to the member 117 as by headed portions 118. A coil spring 119 engages a rear face 121 of the base 111 and encircles a flange 122 of the cup-shaped member 117 to urge it away from the base face 121. This force exerts a tension on the wire actuators 115, retains the actuator lever 16 in engagement with the base surface 113 and maintains the ball and socket connection at the mirror head.

While it will be apparent that the preferred embodiments of the invention disclosed are well calculated to fulfill the objects above stated, it will be appreciated that the invention is susceptibe to modification, variation and change.

What is claimed is:

1. A remote control device comprising a control member, means supporting said control member for pivotal movement, a controlled member, means supporting said controlled member for movement, flexible transmitter means, means operatively connecting said flexible transmitter means to said controlled member, and means operatively connecting said flexible transmitter means to said control member for transmitting pivotal movement of said control member to movement of said controlled member, the operative connection between said flexible transmitter means and one of said members including amplifying means for magnifying the degree of movement between said flexible transmitter means and said one member for amplifying the movement of said controlled member in response to a given movement of said control member.

2. A remote control device as set forth in claim 1 wherein the controlled member comprises a rear view mirror, the means supporting said rear view mirror being adapted to be connected to the exterior of a motor vehicle body and supporting said mirror for universal pivotal movement, the control member comprising means adapted to be positioned in the interior of the vehicle, the means supporting said control member for pivotal movement comprising means supporting said control member for universal pivotal movement.

3. A remote control device as set forth in claim 1 wherein the flexible transmitter means comprises a plurality of flexible transmitters, each of said flexible transmitters being operatively connected to the controlled member at respective spaced locations, each of said flexible transmitters being operatively connected to said control member at respective spaced locations, there being at least one amplifying means in the operative connection of each of said flexible transmitters to the one member.

4. A remote control device as set forth in claim 3 wherein each of the amplifying means comprises guide means and the respective flexible transmitter extends across the respective of said guide means.

5. A remote control device as set forth in claim 4 wherein the controlled member comprises a rear view mirror, the means supporting said rear view mirror being adapted to be connected to the exterior of a motor vehicle body and supporting said mirror for universal pivotal movement, the control member comprising means adapted to be positioned in the interior of the vehicle, the means supporting said control member for pivotal movement comprising means supporting said control member for universal pivotal movement.

6. A remote control device as set forth in claim 5 wherein each of the flexible transmitters comprises a wire actuator.

7. A remote control device as set forth in claim 5 wherein each of the flexible transmitters comprises a respective wire actuator and further includes a common flexible member having a plurality of flexible arms, there being one such arm for each of said wire actuators, the respective end of each of said wire actuators being affixed to a respective one of said arms, said arms extending across the respective of the guide members.

8. A signal amplifying control unit for adjusting the position of a remotely located device, said control unit comprising a base, a control member supported for pivotal movement relative to said base, flexible transmitter means adapted to be connected at one end thereof to the remotely located device, the other end of said flexible transmitter means comprising a first portion extending past said base toward said control member and a second portion extending from said control member toward said base, means fixing said second portion to said base, and guide means carried by said control member and displaced from the pivot axis of said control member, an intermediate portion of said flexible transmitter means between its said first portion and said second portion extending across said guide means for amplifying the movement of said first portion relative to said base in response to a given degree of pivotal movement of said control member.

9. A signal amplifying control unit as set forth in claim 8 further including biasing means for tensioning the flexible transmitter means.

10. A signal amplifying control unit as set forth in claim 9 wherein the biasing means urges the control member away from the base for tensioning the flexible transmitter means and for maintaining said flexible transmitter means in engagement with the guide means.

11. A signal amplifying control unit as set forth in claim 8 wherein the control member is supported for pivotal movement relative to the base by a pilot member, said pilot member defining a guide surface in engagement with a complementary recess formed in said control member.

12. A signal amplifying control unit as set forth in claim 11 wherein the pilot member is formed integrally with the base.

13. A signal amplifying control units as set forth in claim 11 wherein the base defines a bore, the pilot member being slidably supported in said bore.

14. A signal amplifying control unit as set forth in claim 13 further including biasing spring means interposed between the base and the pilot member for urging said pilot member away from said base and for tensioning said flexible transmiter means.

15. A signal amplifying control unit as set forth in claim 8 further including biasing means for yieldably supporting the guide means relative to the control member and for tensioning the flexible transmitter means.

16. A signal amplifying control unit as set forth in claim 8 further including biasing means interposed between the second portion of the flexible transmitter means and the base and forming a portion of the means for fixing said second portion to said base, said biasing means exerting a tensioning force upon said flexible transmitter means.

17. A signal amplifying control unit adapted to be positioned in the interior of a motor vehicle for controlling the position of an outside mounted remote controlled rear view mirror, said control unit comprising a retainer member defining an internal cavity and adapted to be affixed to the vehicle, a control lever having a portion extending through said cavity in said retainer member and adapted to extend into the interior of the vehicle, a base member, a plurality of spaced supporting means integrally formed with said retainer member for affixing said base with respect to said retainer member, pilot means carried by said base and defining a supporting surface, said control lever defining a cavity, said supporting surface of said pilot means being received in said cavity of said control lever for journaling said control level upon said pilot means, a plurality of flexible transmitters each having a protective sheath and an associated wire actuator, means affixing one end of each of said protective sheaths to said base at spaced locations, said control lever having outstanding flange means defining guide surfaces, there being one such guide surface for each of said wire actuators, each of said wire actuators having a first portion extending between said base and said control lever flange means, an intermediate portion extending across a respective guide surface of said flange means and a third portion extending from said flange means to said base, and means for affixing one end of said third portion of each of said wire actuators to said base.

18. A compact signal amplifying control unit adapted to be positioned in the interior of a motor vehicle for controlling the position of an outside mounted remote controlled rear view mirror, said control unit comprising a retainer member defining an internal cavity and adapted to be affixed to the vehicle, a control member having a portion extending through said cavity in said retainer member and adapted to extend into the interior of the vehicle for manipulation thereof, a base member juxtaposed to said retainer member, supporting means carried by said base member for supporting said control member for pivotal movement, a flexible transmitter having a protective sheath and an associated wire actuator, means affixing one end of said protective sheath to said base member, means defining a guide surface supported by said control member for simultaneous movement with said control member, said wire actuator having a first portion adapted to be connected to the rear view mirror and extending through said protective sheath, said first portion of said wire actuator extending from said one end of said protective sheath from said base toward said guide means, said wire actuator having an intermediate portion extending across said guide means and a third portion extending from said intermediate portion back toward said base member, and means for affixing said third portion of said wire actuator to said base.

References Cited

UNITED STATES PATENTS

| 1,718,258 | 6/1929 | Schmidt. | |
| 3,046,841 | 7/1962 | Kawecki | 74—501 |
| 3,195,370 | 7/1965 | Smith | 74—501 |
| 3,253,481 | 5/1966 | Warhol | 74—501 |

FRED C. MATTERN, JR., Primary Examiner

M. ANTONAKAS, Assistant Examiner

U.S. Cl. X.R.

74—517